United States Patent [19]
Bruhnke et al.

[11] Patent Number: 4,786,540
[45] Date of Patent: Nov. 22, 1988

[54] BLOW-MOLDED SUPPORTING BODY

[75] Inventors: Urlich Bruhnke, Ehningen; Jürgen Körber, Sindelfingen; Jürgen Pfaffenbach, Hemmingen, all of Fed. Rep. of Germany

[73] Assignee: Daimler-Benz Aktiengesellschaft, Stuttgart, Fed. Rep. of Germany

[21] Appl. No.: 162,687

[22] Filed: Mar. 1, 1988

[30] Foreign Application Priority Data

Mar. 2, 1987 [DE] Fed. Rep. of Germany ....... 3706640
Dec. 1, 1987 [DE] Fed. Rep. of Germany ....... 3740687

[51] Int. Cl.$^4$ .............................................. B32B 3/26
[52] U.S. Cl. ........................................ 428/71; 428/76; 428/159; 428/160; 428/188; 428/316.6; 428/319.7
[58] Field of Search ................... 428/71, 76, 159, 160, 428/188, 316.6, 319.7

[56] References Cited

U.S. PATENT DOCUMENTS

| | | | |
|---|---|---|---|
| 2,959,508 | 11/1960 | Graham et al. | 428/71 |
| 3,616,172 | 10/1971 | Rubens | 428/71 |
| 4,459,331 | 7/1984 | Brix et al. | 428/71 |

FOREIGN PATENT DOCUMENTS 1704057 5/1971 Fed. Rep. of Germany .
3209464 9/1983 Fed. Rep. of Germany .

Primary Examiner—William J. Van Balen
Attorney, Agent, or Firm—Barnes & Thornburg

[57] ABSTRACT

A crash element is provided which includes at least one covering layer element for covering at least a portion of a blow-molded supporting body. A foam material is disposed in at least a portion of an interior of the blow-molded supporting body. Molded-on fastening elements are provided in an area devoid of the at least one covering layer element.

12 Claims, 3 Drawing Sheets

BLOW-MOLDED SUPPORTING BODY

BACKGROUND AND SUMMARY OF THE INVENTION

The invention relates to a crash apparatus which takes the form of a blow-mold supporting body and which is covered at least partially by at least one covering layer. The supporting body bonds with each covering layer.

Blow molding is known from German Published Unexamined Patent 1,704,057 which provides a bottle with sealed-on labels.

An object of the present invention is to provide crash elements including a blow-molded supporting body such that a wide field of application is available for the parts, in particular with respect to motor vehicles.

This object is achieved by providing a crash apparatus which has at least one covering layer element which covers at least a portion of a blow-molded supporting body and is bonded with the blow-molded supporting body. Foamed material is disposed in an interior area of the supporting body, and molded-on fastening elements are disposed in an area devoid of the covering layer element. The crash element of the present invention not only exhibits injury-reducing characteristics, but also provides simplified fastening and exchangeability.

According to advantageous features according to certain preferred embodiments of the invention, at least one tube member or body is included in the foamed material. In certain preferred embodiments, the tube body may take the form of an air duct or a duct serving to receive lines such as electric lines.

According to other advantageous features according to certain preferred embodiments of the invention, each tube body may take the form of a deformation element to increase the energy absorption capacity. In certain preferred embodiments, a cluster of tubes is provided. Such a cluster of tubes has an advantage over an individual tube that the energy absorption and the level of force thereby occurring can be controlled, for example by the material properties and/or the tube thickness, such that a rectangular characteristic is obtained for the force curve.

According to other advantageous features according to certain preferred embodiments of the invention, the foamed material consists of filled spherical polystyrene, which is available in a wide variety of degrees of hardness and with which even wound and/or bent supporting bodies can be completely filled.

According to other advantageous features according to certain preferred embodiments of the invention, the polystyrene is introduced in layers with increasing hardness in impact direction, so that, for example, a particularly soft immersion of part of the body in the initial phase of the braking operation can be achieved.

According to other advantageous features according to certain preferred embodiments of the invention, the spherical polystyrene is interbonded by polyurethane foam.

According to other advantageous features of certain preferred embodiments of the invention, the supporting body and simultaneously formed fastening elements are made of thermoplastics such as polyamides, polyolefins and polyvinyl chloride (PVC).

Other objects, advantages and novel features of the present invention will become apparent from the following detailed description of the invention when considered in conjunction with the accompanying drawings.

DETAILED DESCRIPTION OF THE DRAWINGS

Figure 1:
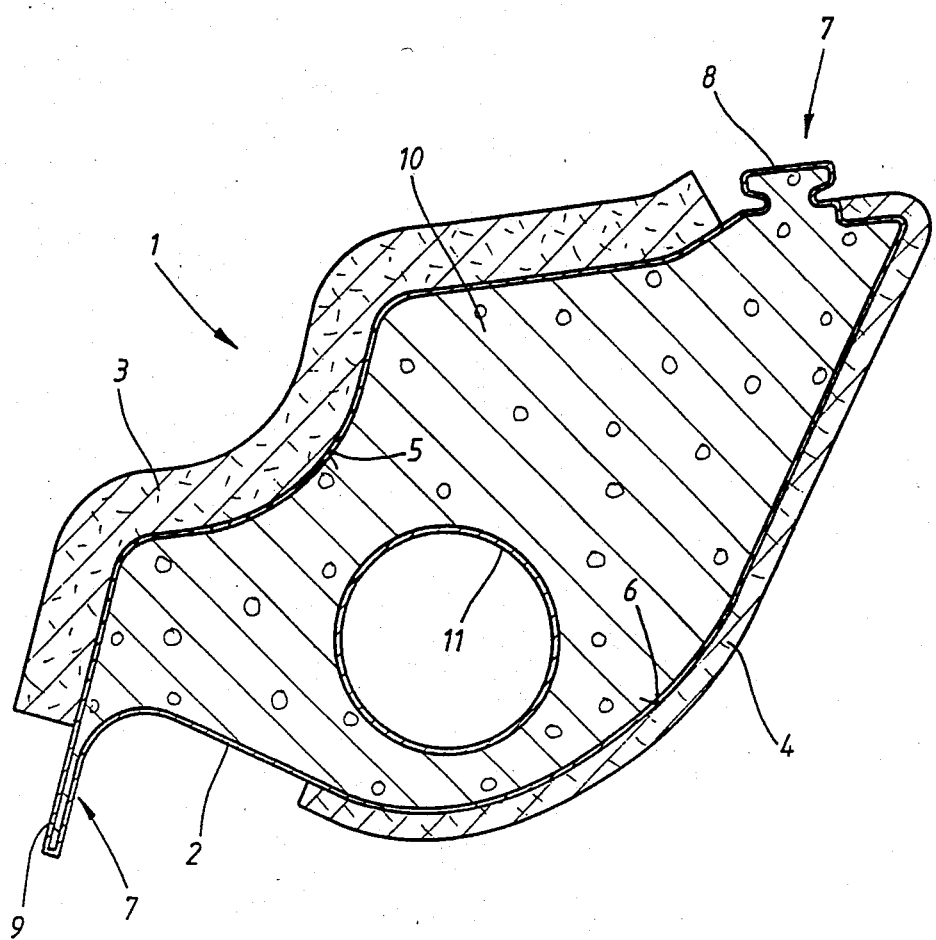
FIG. 1 is a cross-sectional view of a first exemplary embodiment of the present invention in the form of a knee crash element with an incorporated tube body surrounded by foamed material.

FIG. 1 shows a section in vehicle longitudinal direction of a motor car through a knee crash element which is fitted underneath a dash board (not shown). The element represented as component 1, includes a supporting body 2 and covering layers 3 and 4 enveloping the supporting body 2 at least partially on the outside.

The component 1 is constructed by first laying the covering layers 3 and 4, precut precisely to size, in an open blow mold. In certain preferred embodiments as illustrated, the covering layer 3 is made of a particularly sound-insulating material, while the covering layer 4 is formed by a section of carpet. In certain preferred embodiments, the covering layer of carpet 4 faces toward the passenger compartment, and thus, impact direction is from this covering layer 4 into the interior of the supporting body. It is contemplated in certain preferred embodiments that sides 5 and 6 of the covering layers 3 and 4 spaced from the wall of the blow mold may be provided with a bonding agent. The covering layers 3 and 4 lie in recesses of the blow mold and are held solely by a clamping effect.

Thereafter, the blow mold is closed and a blowing operation is initiated, and the supporting body 2 develops and bonds with the covering layers 3 and 4. In this blowing operation forming the supporting body 2, fastening elements 8 and 9 are simultaneously molded in areas 7 free from covering layer. The fastening elements 8 and 9 provide for simple fixing of the component 1. It is contemplated to use thermoplastics such as polyamides, polyolefins and PVC as the material for making the supporting body 2 and fastening elements 8 and 9.

The solidified component 1, which is removable after opening of the mold, has an adequate inherent rigidity. If the component 1 is used for energy absorption, as is the case with the knee crash element shown in FIG. 1 as an exemplary embodiment, it is contemplated that the cavity surrounded by the supporting body 2 is filled at least partially with an energy-absorbing foamed material 10. It is also contemplated to incorporate a tube body 11 in the foam core produced by foam-filling. The tube body can itself act as a deformation element. In certain preferred embodiments, the tube body 11 may be connected to the heating and ventilating system of the motor car and serve as feeder line to the air outlet nozzles (not shown). It is also contemplated to lead supply lines, such as electric and pneumatic lines, through the tube body.

It is contemplated that an extremely wide variety of components can be created in the way described above, which can in particular also be designed very flat, as is the case for example with panelling and lining parts, which may also have a film with a decorative surface as a covering layer.

Figure 2:
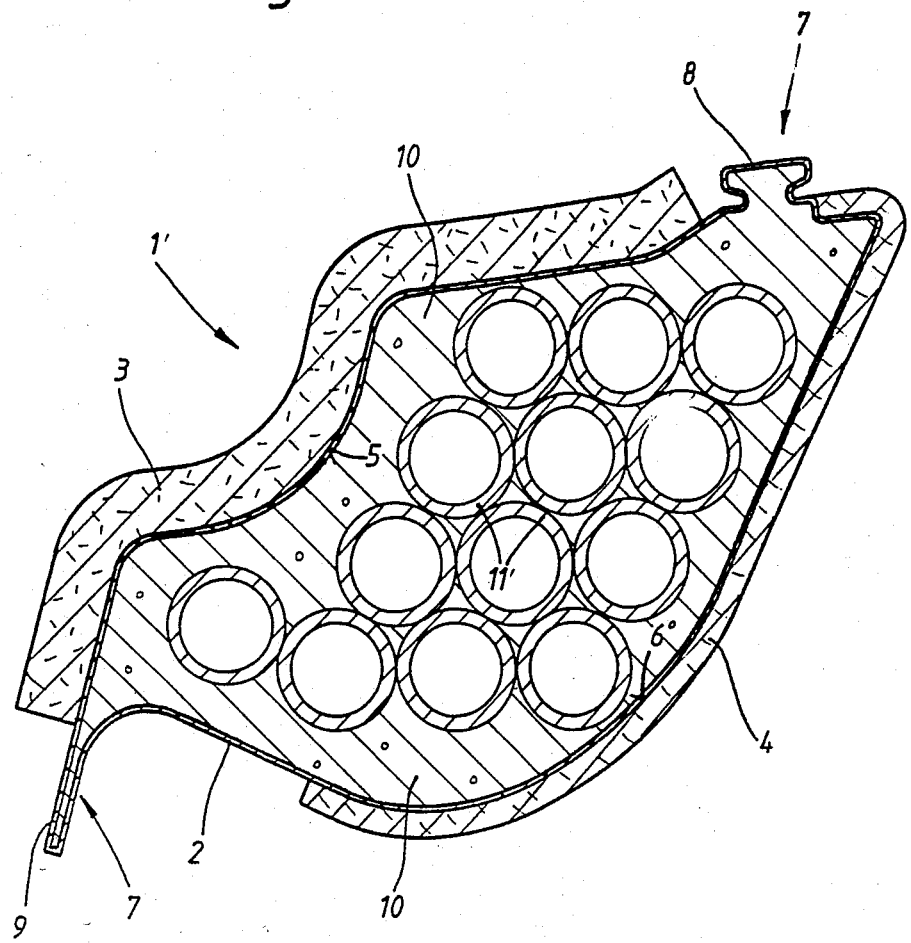
FIG. 2 is a cross-sectional view of a knee crash element according to other preferred embodiments of the invention with a cluster of tubes touching one another and the remaining space being filled with foam material.

In the case of certain preferred embodiments according to FIG. 2, a component 1' is shown which is similar in construction to component 1 according to FIG. 1, and the same reference numerals are used for identical parts. Several individual touching tube bodies 11' are combined in a cluster of tubes which is fixed in mutual position by foamed material 10. By coordination of the strength values of the individual tube bodies 11', an ideal force/displacement characteristic can be achieved, which initially rises extremely sharply, then has an approximately horizontal profile up to reaching the limit of the energy absorption capacity.

Figure 3:
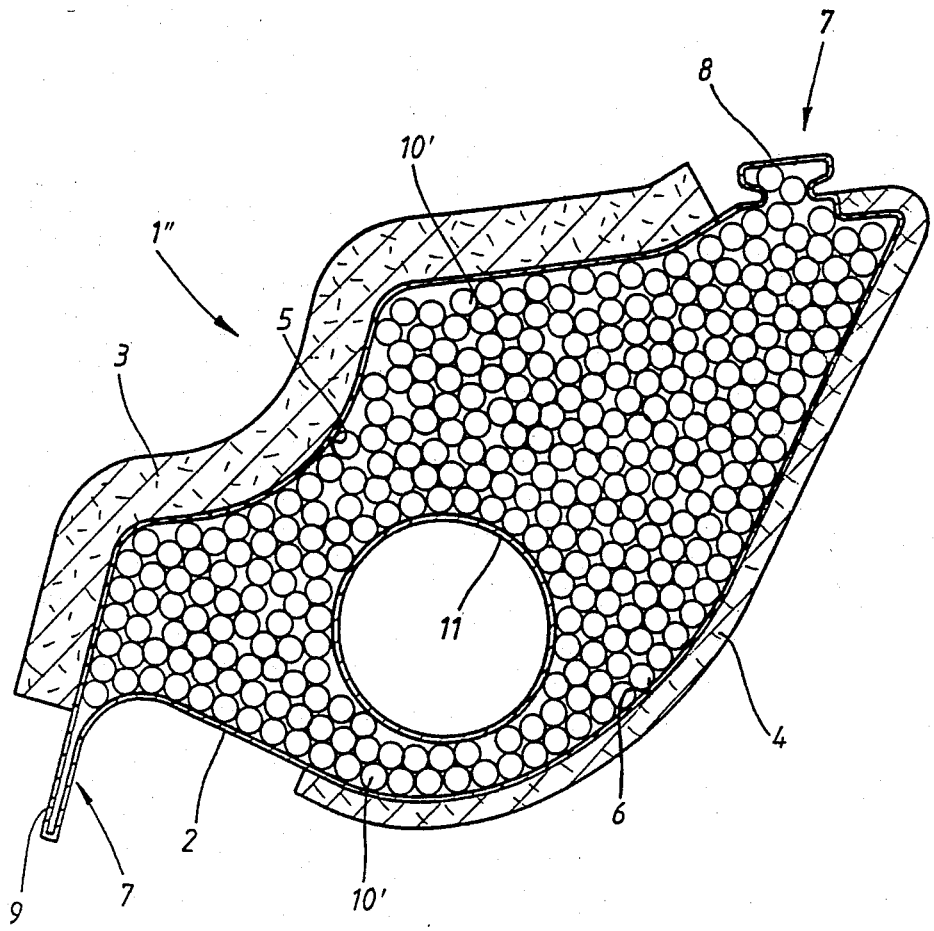
FIG. 3 is a cross-sectional view of a knee crash element according to other preferred embodiments of the invention with an incorporated individual tube body and a fill of spherical polystyrene.

In the case of certain preferred embodiments according to FIG. 3, component 1'' is shown which is similar in construction to the exemplary embodiments of components 1 and 1' according to FIGS. 1 and 2, respectively, and the same reference numbers are again used for identical parts. The foamed material 10' is formed of spherical polystyrene, which surrounds the tube body 11. The foamed material beads, which have a hardness adapted to the case in question, are fed in. A filling in layers with varyingly hard foamed material 10 is also contemplated with a corresponding position of the feed opening. In order to obtain a solid unit at the end of the filling, the remaining cavities are filled with polyurethane foam, which is introduced, for example, through a lance.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Crash apparatus comprising:
   a blow molded supporting body having an interior area;
   at least one covering layer means for covering at least a portion of said blow-molded supporting body, said at least one covering layer means being bonded with said blow-molded supporting member;
   foamed material disposed in at least a portion of said blow-molded supporting body interior area; and
   molded-on fastening means disposed in an area of said blow-molded supporting body devoid of said at least one covering layer means.

2. Apparatus as in claim 1, further including at least one tube member disposed in said foamed material.

3. Apparatus as in claim 2, wherein each of said at least one tube members comprises a deformable element.

4. Apparatus as in claim 3, wherein each of said at least one tube members is fixed relative to said blow-molded supporting body by means of said foamed material.

5. Apparatus as in claim 3, including a plurality of tube members, said plurality of tube members being fixed relative to one another by means of said foamed material.

6. Apparatus as in claim 1, wherein said foamed material consists of filled spherical polystyrene.

7. Apparatus as in claim 1, wherein said foamed material comprises filled spherical polystyrene.

8. Apparatus as in claim 7, wherein said supporting body includes a portion designed to received impact from a given direction, said foamed material including a plurality of layers of polystyrene leading from said impact receiving portion, said polystyrene layers including a given hardness which increases in said given impact direction.

9. Apparatus as in claim 7, wherein said foamed material further includes spherical polystyrene interbonded with polyurethane foam.

10. Apparatus as in claim 1, wherein said blow-molded supporting body includes an outside surface opposite said interior area, said at least one covering layers means covering at least a portion of said blow-molded supporting body outer surface.

11. Apparatus as in claim 1, wherein said blow-molded supporting body and said molded-on fastening means are made of identical material.

12. Apparatus as in claim 1, wherein said blow-molded supporting body and said molded-on fastening means are made of thermoplastic material comprising at least one of polyamides, polyolefins and polyvinyl chloride.

* * * * *